May 24, 1966     L. B. GERSON ETAL     3,253,070
PRODUCTION OF PEARLY PLASTIC SHEET
Filed Dec. 28, 1961
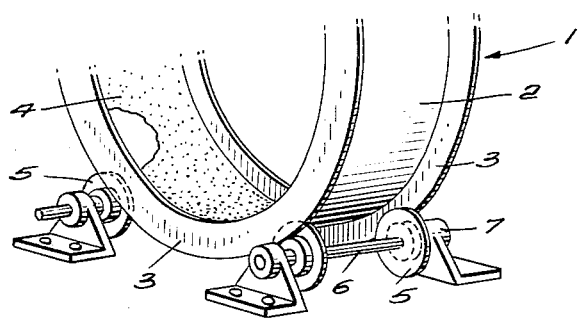
INVENTORS
LYNN B. GERSON,
TIBOR ETLENYI,
BY PAUL F. BRUINS,
Pennie Edmonds Morton Taylor
and Adams
ATTORNEYS

United States Patent Office 3,253,070
Patented May 24, 1966

3,253,070
PRODUCTION OF PEARLY PLASTIC SHEET
Lynn B. Gerson, Great Neck, Tibor Etlenyi, Woodside, and Paul F. Bruins, Douglaston, N.Y., assignors, by mesne assignments, to Patrician Plastic Corp., Long Island, N.Y., a corporation of Maine
Filed Dec. 28, 1961, Ser. No. 162,935
9 Claims. (Cl. 264—108)

This invention relates to a novel method of producing pearly plastic sheets of enhanced pearly appearance.

The United States patent to Gerson and Bruins No. 2,856,635 describes and claims a method of producing pearly plastic material by slowly pouring a polymeric unsaturated polyester resin containing pearl essence onto the inner surface of a drum rotating about its horizontally disposed axis. The resin is poured in amount sufficient to form a sheet-like layer of the resin over the inner surface of the drum. Rotation of the drum is continued until the resin has polymerized to the flaccid state, and then the sheet of flaccid resin is cut and is removed from the drum. The resulting sheet, which contains the pearl essence in a state of orientation conducive to optimum nacreous appearance, is sufficiently flaccid to readily assume a flat form from which a multiplicity of article blanks, such as button blanks, can be punched in a single punching operation. Completion of the polymerization of the blanks by the mere passage of time results in a hard thermoset resin product.

Although the article blanks produced by the method of the Gerson and Bruins patent, particularly when buffed, exhibit a maximum nacreous appearance due to optimum orientation of the pearl essence, they nevertheless lack the irregular texture and frequent color variation typical of mother-of-pearl. We have now discovered how to modify the method of the Gerson and Bruins patent so as to obtain the natural appearance of mother-of-pearl, or other enhanced appearance, without in any way detracting from the utility and effectiveness of that method.

In the practice of our invention, a pattern of discrete masses of a similar but more viscous polymeric unsaturated polyester resin is applied to the surface of the casting drum before the sheet-forming resin mixture is poured into the drum. These masses may contain pearl essence or may be free of pearl essence and may also contain one or more coloring constituents. Whether the patterned masses are then polymerized to a gelled condition or are left in their as-applied condition, the sheet-forming resin mixture is thereupon poured into the drum pursuant to the method of the Gerson and Bruins patent. The resulting sheet-like product is composed essentially of a cross-linked polyester one surface portion of which contains inclusions of discrete masses of a cross-linked polyester resin characterized by a different appearance than that of the including resin. When the patterned masses are in the form of droplets, the sheet product closely approximates, particularly when polished, the irregular or natural appearance of mother-of-pearl. When the patterned masses are in the form of ridges or the like, a different type of pleasing irregularity is imparted to the appearance of the sheet product.

Other important features will be evident hereinafter by the following description of the invention.

The figure of the drawing depicts a partial perspective view of the centrifugal casting machine used to practice the method of this invention.

The centrifugal casting machine comprises a drum, generally indicated by 1, which carries a central outer cylindrical portion 2, two outer flange portions 3 extending around the periphery of the cylindrical portion and a central inner cylindrical portion 4.

A portion of the flange 3 extending beyond the outer surface of the cylinder engages idler wheels 5 carried by shafts 6 which are arranged between bearing mounts 7. The shafts 6 are rotated by any suitable driving means, such as a motor (not shown).

The resin applied to the inner surface of the casting drum in the form of a pattern of discrete masses pursuant to the present invention comprises an unsaturated cross-linking polyester resin having a viscosity sufficient to maintain the general discrete form of the masses preferably but not necessarily until they can be partially polymerized to a self-supporting state. These resins are the polycondensation products of dicarboxylic acids with dihydric alcohols either or both of which are unsaturated. The resin is rendered capable of cross-linking by dissolving it in a monomeric copolymerizable compound, such as styrene, and contains a suitable addition polymerization catalyst such as hydrogen peroxide, benzoyl peroxide, methyl ethyl ketone peroxide, or other free radical catalyst. Resin viscosities within the range of about 2,000 to about 25,000 centipoises at 20° C. generally are sufficient for the practice of our invention. Where a pronounced irregularity of appearance is desired, particularly when the applied masses are in the form of discrete droplets, we have found it advantageous to partially polymerize these masses to the gel state before centrifugally casting the sheet forming-resin. Where a less pronounced irregularity is desired, as is generally the case when the applied masses are in the form of thin lines or ridges, we have found it advantageous to centrifugally cast the sheet-forming resin over the applied pattern of viscous resin without effecting prior partial polymerization of this pattern. Whether the applied pattern is or is not partially polymerized prior to the centrifugal casting of the sheet-forming resin, the more viscous the pattern-forming resin within the aforementioned range the more completely the patterned masses will hold their shape and thus the more deeply patterned will be the final sheet product.

The viscous resin is advantageously applied to the drum surface in the form of patterned discrete masses by means of a roller or the like carrying the resin on its surface. For this purpose, we have found that painters' rollers, generally of rubber-like material and having a distinct surface pattern, are capable of forming any desired pattern of discrete masses of the viscous resin. The roller bearing the resin is rolled peripherally around the inner surface of the drum either in a single pass or even in a plurality of passes. The number of passes depends, of course, on the nature of the pattern on the roller surface and all passes subsequent to the first pass should be such as not to destroy the desired formation of substantially discrete masses of the resin on the drum surface. The depth of these masses can be further increased by permitting one applied pattern to be partially polymerized and by then applying a second coating with the same or a different roller, the surface of the roller during this second coating generally making contact predominantly, but not exclusively, with the previously applied self-supporting masses. When it is desired to deposit the discrete masses in the form of a straight or curved thin ridge or the like, we have found it advantageous to apply such masses to the drum surface by pouring the viscous resin onto the drum in a thin stream.

Inasmuch as the pattern of discrete masses of the viscous resin is applied to the surface of the drum by a direct rolling contact between the roller and the drum or by a simple pouring action into a stationary drum, or by a combination of these techniques, there is no shearing action which will cause orientation of any pearl essence in the resin, the only orientation being the limited amount effected by the pressure of the applicator when this technique is used. Thus, when the viscous resin contains pearl essence, the orientation of the pearl essence is markedly less than that obtained by the shearing action when the sheet-forming resin is poured into the rotating drum; consequently, although both the viscous resin and the sheet-forming resin may contain pearl essence, the degree of orientation of the pearl essence in the two resins will be different and an irregular surface appearance will result in the final product.

The color of the applied pattern of discrete masses of the viscous resin may be altered at will to produce the iridescence or color highlights characteristic of mother-of-pearl. This color can be imparted by incorporating any conventional plain or fluorescent pigment or compatible coloring agent in the viscous resin, and two or more colors can be applied by applying separate coats of differently colored viscous resin patterns.

The sheet-forming resin which is poured into the drum over the pattern of discrete masses of the more viscous resin is of the same type as the viscous resin, i.e., a polymeric unsaturated polyester resin dissolved in a monomeric copolymerizable compound such as styrene. The resin further contains an addition polymerization catalyst of the free radical type and pearl essence. The viscosity of the sheet-forming resin is advantageously within the range of about 500 to about 2,000 centipoises at 20° C., such viscosity being appropriate to centrifugal casting by the method of the aforementioned Gerson and Bruins patent. The resin may further contain a colored pigment to enhance the natural look of the final product in its resemblance to mother-of-pearl. Thus, a two-color effect can be achieved by the use of two different colors in the pattern-forming resin and in the sheet-forming resin.

The sheet-forming resin is poured slowly into the drum while the drum is rotated at a speed sufficient, considering the viscosity of this resin, to hold the body of resin in the form of a sheet ranging in thickness from about 0.075 inch to about ¼ inch, the body of liquid resin being held in the drum by flanges on the edges of the drum. In the case of a drum having a diameter of 30 inches, a speed of about 75 revolutions per minute will produce a sheet-like body from a casting resin mixture having a viscosity of about 1,000 centipoises at 20° C. Rotation of the drum is continued until the sheet-forming resin has polymerized to the flaccid state, then the drum is stopped, the sheet is cut transversely and is removed from the drum. When placed upon a flat surface, the flaccid sheet lies flat and is amenable to punching to produce one or a multiplicity of article blanks from the single sheet. With the passage of time, generally of about 24 to 48 hours, the cross-linking polymerization of the resin progresses to form a hard, strong thermoset resin product.

The polymerization of the sheet-forming resin takes place around the inclusions of the discrete masses of the previously applied viscous resin. Inasmuch as these included masses are at most only partially polymerized, in the preferred practice of our invention, prior to the centrifugal casting of the sheet-forming resin, the two resins undergo simultaneous polymerization with the result that the cross-linking polymerization extends across the initial boundaries between the discrete masses and the sheet-forming resin. Consequently, the discrete masses are chemically bound to and become an integral part of the surrounding mass of the sheet-forming resin so that they cannot be dislodged during subsequent fabrication either of the flaccid sheet or of the completely set resin. By controlling the rate of reaction of the more viscous resin with respect to that of the sheet-forming resin, generally by choice of their respective content of catalyst or catalyst promoter, or both, the hardness of the two polymerized resin components in the flaccid sheet can be made to be substantially identical so that the product has a uniform "Durometer" in spite of the fact that the two resin components have been gelled at different times.

It will be appreciated that the surface of the sheet product formed adjacent the inner surface of the drum is substantially as smooth as this drum surface and that the other surface of the sheet will have the degree of smoothness characteristic of centrifugally cast material. The inclusion of the first-applied discrete masses or droplets of resin impart to the sheet product the appearance of irregularities or texture of the type characteristic of mother-of-pearl without requiring the removal of any material from either surface of the sheet. However, the high gloss of mother-of-pearl can be readily achieved in the product of our invention by any conventional polishing operation such as buffing or the like. The translucent nature of the pearly pigmented polyester resin permits the irregularities adjacent the drum-finish surface of the sheet to be seen from the other surface of the sheet, and thus the irregularities in orientation or color highlights, or both, are readily apparent at both surfaces of our final product and impart to the product an enhanced beauty and naturalness. Inasmuch as this pleasing appearance characterizes both sides of the blanks formed from the sheet material, the blanks may be further processed in an automatic-feed operation such as an automatic-feed button-making machine.

The following specific example is illustrative of the practice of our invention. An unsaturated polyester resin purchased on the market as American Cyanamid's No. 4120 polyester resin, and having a viscosity of 25,000 centipoises at 20° C., was diluted with 5% by weight of styrene. To this mixture there was added 0.4% by weight of cobalt naphthanate catalyst promoter (containing 6% cobalt). The resulting resin mixture had a viscosity of about 13,000 centipoises at 20° C. A painter's stippling roller of rubber-like material (preferably silicone rubber) and having a surface pattern depth of about 0.25 inch was continuously coated with the viscous resin mixture which had been catalyzed with .1% of 50% hydrogen peroxide just prior to the application. The roller was applied peripherally around the inside of an edge-flanged drum having a diameter of 30 inches and a width of 24 inches. A total of two passes of the roller was required to cover the entire inner surface of the drum with a pattern of discrete masses or droplets of the resin mixture. The average height of these droplets was about .0125 inch although some of them were 50% greater in height, and others 50% less in height than the average, due to the second application. The droplets were spaced about 0.25 to 0.375 inch apart at their centers, and their diameter was 0.125 to 0.25 inch, with a minor amount of overlapping.

After the applied droplets had been permitted to stand for about 10 minutes at ambient room temperature, their polymerization had progressed to the extent that they were gelled and self-supporting. The drum was then rotated at the rate of 75 r.p.m. and a sheet-forming resin mixture was poured slowly into the drum in an amount to form a layer about 0.125 inch thick. This resin mixture was composed of a commercial unsaturated polyester resin marketed by the Allied Chemical Corporation as their Plaskon Resin No. PE–205 and having a viscosity of 2,500 centipoises at 20° C., 5% by weight of styrene, 0.025% by weight of cobalt naphthanate catalyst promoter (containing 6% cobalt), 1½% of synthetic pearl essence, and 0.025% by weight of a silicone oil No. L–520 purchased from Union Carbide Corporation. Just prior to pouring the resin, it was mixed with 0.3% of 50% hydrogen peroxide at ambient room temperature of 25°° C., and the viscosity of the resulting resin mixture was 900 centipoises. This resin mixture gelled in about 9 minutes after the addition of the hydrogen peroxide, but rotation of the drum was continued for about 30 minutes, whereupon the drum was stopped and the sheet-like cylinder of resin was cut transversely and the resulting sheet was removed from the drum and laid on a flat surface. The sheet was then blanked by means of a blanking die to form button blanks.

After a further period of 24 to 48 hours at ambient room temperature, the blanks had hardened to a condition suitable for machining. The resulting hard blanks were characterized by an inclusion on their drum contact surface of discrete masses of a cross-linked polyester resin which were inseparably joined to the main body of the casting. Both surfaces of the blanks exhibited an irregularity in the orientation of the pearly pigment, typical of that of mother-of-pearl, and when machined and surface-polished bore a very close resemblance to buttons made of mother-of-pearl.

The following example is illustrative of the practice of our invention wherein the discrete masses of the more viscous resin are applied in a form other than as droplets. An unsaturated polyester resin purchased from the Allied Chemical Corp. as their Plaskon Resin No. PE–205, and having a viscosity of 2,500 centipoises at 20° C., was mixed with 5% by weight of styrene, 0.025% by weight of cobalt naphthanate catalyst promoter (containing 6% cobalt), 2% of synthetic pearl essence and 0.025% by weight of a silicone oil, purchased from Union Carbide Corp. as their No. L–520. The resulting viscosity was 900 centipoises at 20° C. To 300 grams of this mixture there was added 1% by weight of methyl ethyl ketone peroxide, an addition catalyst and mixing was continued for three minutes. The catalyzed resin was then placed in a flexible polyethylene squeeze bottle equipped with a nozzle having an orifice about 0.125 inch in diameter. The catalyzed resin mixture was then squeezed out of the bottle, with the tip of the nozzle in close proximity to the inside smooth surface of a casting drum 30 inches in diameter, 24 inches wide, revolving on its horizontal axis at the rate of 75 r.p.m., and the bottle was moved from one side of the drum to the other so as to form a continuous spiral thin stripe of essentially parallel lines spaced ¼ inch apart on their centers across the entire inside drum surface. Five minutes after the addition of the methyl ethyl ketone peroxide to the 300 gram batch, a 4,500 gram batch of the same mixture of unsaturated polyester resin was catalyzed with 0.3% by weight of 50% hydrogen peroxide, was mixed for three minutes, and was immediately poured onto the inside surface of the same revolving drum. This catalyzed resin mixture, due to its higher rate of polymerization, gelled in the casting drum at approximately the same time as the previously applied stripes. The rotation of the drum was continued for about 30 minutes, whereupon the drum was stopped and the sheet-like cylinder of resin, approximately 0.10 inch thick, was cut transversely and the resulting sheet was removed from the drum and laid on a flat surface. The sheet was then blanked by means of a blanking die to form button blanks.

After 24 to 48 hours at ambient room temperature, these blanks had hardened to a condition suitable for machining into buttons. The resulting hard blanks were characterized by an inclusion on their drum-contact surface of discrete stripes of a cross-linked polyester resin inseparably joined by cross-linking to the main body of the casting. Both surfaces of the blanks exhibited an attractive irregularity in the orientation of the pearly pigment and thus could be machined into buttons each side of which had a similar pleasing patterned appearance.

We claim:

1. In the method of producing a pearly plastic sheet wherein a mixture comprising a polymeric unsaturated polyester resin, an addition polymerization catalyst and pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a more viscous mixture comprising a similar polymeric unsaturated polyester resin, pearl essence and an addition polymerization catalyst, the pattern of discrete masses being applied to the drum surface while the latter is relatively stationary and thus in the absence of shearing movement between the drum surface and the viscous resin mixture so that there is no significant orientation of the pearl essence in the applied resin mixture, the mixture having a viscosity sufficient to at least partially maintain the discrete form of the masses thereof while the first-mentioned resin mixture is poured into the rotating drum, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

2. In the method of producing a pearly plastic sheet wherein a mixture comprising a polymeric unsaturated polyester resin dissolved in a monomeric copolymerizable compound, an addition polymerization catalyst and pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a more viscous mixture comprising a similar polymeric unsaturated polyester resin, pearl essence and an addition polymerization catalyst, the pattern of discrete masses being applied to the drum surface while the latter is relatively stationary and thus in the absence of shearing movement between the drum surface and the viscous resin mixture so that there is no significant orientation of the pearl essence in the applied resin mixture, the mixture having a viscosity sufficient to at least partially maintain the discrete form of the masses thereof while the first-mentioned resin mixture is being poured into the rotating drum, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

3. In the method of producing a pearly plastic sheet wherein a mixture comprising a polymeric unsaturated polyester resin dissolved in a monomeric copolymerizable compound, an addition polymerization catalyst and pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a more viscous mixture of a similar polymeric unsaturated polyester resin, an addition polymerization catalyst and pearl essence, the pattern of discrete masses being applied to the drum surface while the latter is relatively stationary and thus in the absence of shearing movement between the drum surface and the viscous resin mixture so that there is no significant orientation of the pearl essence in the applied resin mixture, the mixture having a viscosity sufficient to at least partially maintain the discrete form of the masses thereof while the first-mentioned resin mixture is being poured into the rotating drum, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

4. In the method of producing a pearly plastic sheet wherein a mixture comprising a polymeric unsaturated polyester resin dissolved in a monomeric copolymerizable compound, an addition polymerization catalyst and pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a more viscous mixture of a similar polymeric unsaturated polyester resin, an addition polymerization catalyst, pearl essence and a coloring agent, the pattern of discrete masses being applied to the drum surface while the latter is relatively stationary and thus in the absence of shearing movement between the drum surface and the viscous resin mixture so that there is no significant orientation of the pearl essence in the applied resin mixture, the mixture having a viscosity sufficient to at least partially maintain the discrete form of the masses thereof while the first-mentioned resin mixture is being poured into the rotating drum, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

5. In the method of producing a pearly plastic sheet wherein a mixture comprising (a) a polymeric unsaturated polyester resin polymerizable first to a flaccid state and thereafter to a rigid state, (b) an addition polymerization catalyst and (c) a pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a viscous mixture comprising a similar polymeric unsaturated polyester resin, pearl essence and an addition polymerization catalyst, the pattern of discrete masses being applied to the drum surface while the latter is relatively stationary and thus in the absence of shearing movement between the drum surface and the viscous resin mixture so that there is no significant orientation of the pearl essence in the applied resin mixture, effecting polymerization of the viscous resin mixture to the gelled state, and then pouring the first-mentioned resin mixture into the rotating drum over the pattern of the discrete masses of the thus-polymerized viscous resin, whereby the resin mixture in the pattern thereof applied to the drum surface is characterized by random orientation of its pearl essence and the resin mixture poured onto the drum surface around the discrete masses in the pattern is characterized by orientation of its pearl essence in a plane substantially parallel to the plane of the drum surface.

6. In the method of producing a pearly plastic sheet wherein a mixture comprising (a) a polymeric unsaturated polyester resin polymerizable first to a flaccid state and thereafter to a rigid state, (b) an addition polymerization catalyst and (c) a pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a viscous mixture comprising a similar polymeric unsaturated polyester resin, an addition polymerization catalyst and pearl essence, the pattern of discrete masses being applied to the drum surface while the latter is relatively stationary and thus in the absence of shearing movement between the drum surface and the viscous resin mixture so that there is no significant orientation of the pearl essence in the applied resin mixture, effecting polymerization of the viscous resin mixture to the flaccid state, and then pouring the first-mentioned resin mixture into the rotating drum over the pattern of the discrete masses of the thus-polymerized viscous resin, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

7. In the method of producing a pearly plastic sheet wherein a mixture comprising (a) a polymeric unsaturated polyester resin polymerizable first to a flaccid state and thereafter to a rigid state, (b) an addition polymerization catalyst and (c) a pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying directly to the inner surface of the drum prior to the pouring of the resin mixture thereinto a pattern of raised discrete masses of a viscous mixture comprising a similar polymeric unsaturated polyester resin, an addition polymerization catalyst, pearl essence and a coloring agent, the pattern of discrete masses being applied to the drum surface while the latter is relatively stationary and thus in the absence of shearing movement between the drum surface and the viscous resin mixture so that there is no significant orientation of the pearl essence in the applied resin mixture, effecting polymerization of the viscous resin mixture to the flaccid state, and then pouring the first-mentioned resin mixture into the rotating drum over the pattern of the discrete masses of the thus-polymerized viscous resin, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

8. In the method of producing a pearly plastic sheet wherein a mixture comprising (a) a polymeric unsaturated polyester resin polymerizable first to a flaccid state and thereafter to a rigid state, (b) an addition polymerization catalyst and (c) a pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, and the resulting sheet of flaccid resin is cut transversely and removed from the drum, the improvement which comprises enhancing the naturalness of the pearly appearance of the sheet by applying to the inner surface of the drum prior to the pouring of the resin mixture thereinto a pattern of raised discrete masses of a viscous mixture comprising a similar polymeric unsaturated polyester resin, pearl essence and an addition polymerization catalyst, effecting polymerization of the viscous resin mixture, the pattern of discrete masses being applied to the drum surface while the latter is relatively stationary and thus in the absence of shearing movement between the drum surface and the viscous resin 45 mixture so that there is no significant orientation of the pearl essence in the applied resin mixture, applying to the discrete masses of the thus-polymerized viscous resin a second pattern of a viscous mixture comprising a similar polymeric unsaturated polyester resin and an addition polymerization catalyst, effecting polymerization of the second-applied pattern of the viscous resin mixture to the flaccid state and then pouring the first-mentioned resin mixture into the rotating drum over the pattern of the discrete masses of the thus-polymerized viscous resin, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

9. In the method of producing a pearly plastic sheet wherein a mixture comprising (a) a polymeric unsaturated polyester resin polymerizable first to a flaccid state and thereafter to a rigid state, (b) an addition polymerization catalyst and (c) pearl essence is poured slowly onto the inner surface of a drum rotating about its horizontally disposed axis so as to effect orientation of the pearly essence by shearing action between the moving drum surface and the resin mixture poured thereon, the resin mixture being supplied in amount sufficient to form a sheet-like layer thereof over the inner surface of the drum, the rotation of the drum is continued until the resin mixture has polymerized to the flaccid state, the resulting sheet of flaccid resin is cut transversely and removed from the drum, and the flaccid sheet is blanked to form a multiplicity of article blanks, the improvement which comprises enhancing the naturalness of the pearly appearance of the sheet by applying directly to the inner surface of the drum prior to the pouring of the resin mixture thereinto a pattern of raised discrete masses of a viscous mixture comprising a similar polymeric unsaturated polyester resin, pearl essence and an addition polymerization catalyst, the pattern of discrete masses being applied to the drum surface while the latter is relatively stationary and thus in the absence of shearing movement between the drum surface and the viscous resin mixture so that there is no significant orientation of the pearl essence in the applied resin mixture, effecting polymerization of the viscous resin mixture to the flaccid state, and then pouring the first-mentioned resin mixture into the rotating drum over the pattern of the discrete masses of the thus-polymerized viscous resin, whereby the resin mixture in the pattern thereof applied directly to the drum surface is characterized by random orientation of its pearl essence and the resin mixture poured onto the drum surface around the discrete masses in the pattern is characterized by orientation of its pearl essence in a plane substantially parallel to the plane of the drum surface.

References Cited by the Examiner

UNITED STATES PATENTS

| | | | |
|---|---|---|---|
| 2,856,635 | 10/1958 | Gerson et al. | 18—47.5 |
| 2,914,436 | 11/1959 | Nakielny | 154—43 |
| 2,940,125 | 6/1960 | Beucker | 18—47.5 |
| 2,990,306 | 6/1961 | Dyer | 154—43 |
| 3,079,644 | 3/1963 | Molitor et al. | 264—310 |

ROBERT F. WHITE, *Primary Examiner.*

MICHAEL V. BRINDISI, ALEXANDER H. BRODMERKEL, *Examiners.*

R. J. DOHERTY, J. R. DUNCAN, M. R. DOWLING,
*Assistant Examiners.*